United States Patent [19]

Morris

[11] 3,886,303

[45] May 27, 1975

[54] AUTOMATIC RANGING IN AN ACTIVE TELEVISION SYSTEM

[75] Inventor: Edwin E. Morris, Clinton, N.Y.

[73] Assignee: General Electric Company, Utica, N.Y.

[22] Filed: Oct. 21, 1972

[21] Appl. No.: 317,203

[52] U.S. Cl. .............. 178/6; 178/7.2; 178/DIG. 23; 178/DIG. 6; 178/DIG. 27

[51] Int. Cl. .............. H04n 3/12

[58] Field of Search ......... 178/DIG. 6, DIG. 23, 7.2, 178/6, 5.4 ST, 27

[56] References Cited

UNITED STATES PATENTS

| | | | |
|---|---|---|---|
| 3,305,633 | 2/1967 | Chernoch | 178/6.8 |
| 3,630,616 | 12/1971 | Everest | 356/4 |
| 3,736,377 | 5/1973 | Warren et al. | 178/6.8 |

FOREIGN PATENTS OR APPLICATIONS

| | | | |
|---|---|---|---|
| 1,238,467 | 0000 | United Kingdom | 178/5.4 ST |

*Primary Examiner*—Howard W. Britton
*Assistant Examiner*—Edward L. Coles

[57] ABSTRACT

In an airborne or otherwise elevated active television system, a pulse width modulator determines the delay between a laser pulse provided by a transmitter and a range gate pulse in a gated television camera. The integral of a composite video signal, indicative of scene brightness, in the upper half of the field of view of the television camera is compared to the integral of the composite video signal in the lower half of the field of view in order to provide a control signal to the pulse width modulator to control the receiver gate delay. Since in an airborne system no laser pulse return is received unless the television camera is range gated at a distance equal to the distance of the ground, the above-described comparison keeps the receiver range gate centered at the distance of interest.

6 Claims, 3 Drawing Figures

AUTOMATIC RANGING IN AN ACTIVE TELEVISION SYSTEM

BACKGROUND OF THE INVENTION

This invention relates to an electro-optical system adapted for viewing objects under conditions of darkness or limited visibility, and more particularly to a pulsed laser system incorporating a range gated television camera.

The present invention is particularly suited for an airborne or otherwise elevated active television system.

In an active television system, a light pulse is transmitted by an illuminator such as a pulsed laser, and a receiver, more particularly a television camera, is gated at a time after transmission of the light pulse to receive the reflected light pulse. The delay time between the transmission of the light pulse and the gating of the television camera, called the range delay, determines the range from which the receiver is responsive to reflected pulses, and the width of the receiver gate pulse determines receiver depth of the field. In present systems, the illuminator comprises a pulsed laser, and the receiver may comprise a gated image intensifier coupled to a vidicon tube or other well-known electro optical receiver.

In an application such as an airborne active television system viewing the ground, video output is provided by the image intensifier only when the receiver range cell is placed at a distance from the ground to the aircraft. When the receiver is gated such that the range cell is above or below the ground, there are no reflected returns to which to respond. As a camera is panned, in order to scan the ground, slant range to the ground changes continually. Further, aircraft altitude may vary along a course, also changing the distance from the television camera to the ground. Consequently, in order to receive a reflected image from the ground, the range delay requires constant readjustment. In prior active television systems, a manual selection of range delay is made, requiring attention by an operator and occasionally entailing a loss of a received image.

SUMMARY OF THE INVENTION

It is therefore an object of the present invention to provide automatic ranging of an active television system.

It is a more specific object of the present invention to provide automatic ranging of an airborne or otherwise elevated active television system.

It is a particular object of the present invention to provide means for automatic control of range delay in an active television system by responding to video output of a television camera.

Briefly stated, in accordance with the present invention there is provided an active television system in which video outputs indicative respectively of upper and lower portions of a field of view are integrated and compared. A signal indicative of the comparison is coupled to a pulse width modulator to generate a range delay proportional thereto. In this manner, the receiver range gate is centered on a range cell from which maximum video reception is obtained.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation may be further understood by reference to the following description taken in connection with the following drawings.

Of the drawings.

DESCRIPTION OF THE PREFERRED EMBODIMENTS

Figure 1:
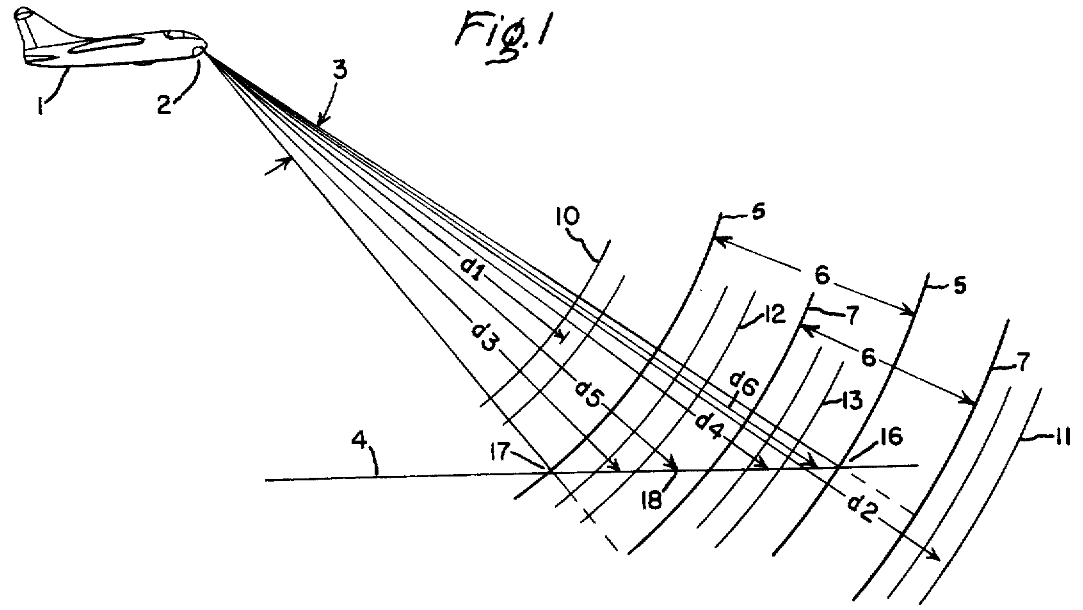
FIG. 1 is an optical diagram of operation of the present invention.

Referring now to FIG. 1 there is illustrated an aircraft 1 bearing an active television system 2 having a field of view 3 for viewing a target comprising the ground 4. As explained in more detail below, the active television system transmits optical energy, more particularly a laser pulse, and responds to optical returns within a range gate 5 at a selected distance having a selected depth of field 6. If the active television system 2 is range gated to respond to returns from a range cell 10, within the field of view 3 at a distance dl, which is above the ground, no returns are received. Consequently, a black level video output is provided in response thereto. Similarly, if the active television system 2 is gated to respond to returns from a range cell 11 within the field of view 3 at a distance d2, below the ground, there is no return which will be received, and a black level video output is provided. (Distances are specified to the center of a range gate or cell. Range cells comprise units of distance from the active television system 2 and are utilized for purposes of illustration). Returns will be received from range cells 12 and 13 at distances d3 and d4 respectively from the active television system 2 within the field of view 3 at a distance corresponding to ground level. It is noted that normally receiver depth of field is selected to have sufficient depth to receive light from all ground points within the field of view 3 of the active television system 2.

The points 16 and 17 are representative of opposite intersections of a field of view 3 with the ground 4. The point 16 would appear at the upper line of a television monitor display connected to the active television system 2 and a point 17 would appear at the lower line. A point 18 is representative of the center of the field of view 3 which would be scanned by lens 23 (FIG. 2) in the illustration of FIG. 1. When the gate 5 is centered on the point 18 at a distance d5 and the depth of field 6 is adjusted to encompass the points 16 and 17, the ground 4 within the range gate 5 is said to be illuminated. For simplicity of description, when the object within a range cell or gate from which returns are received is illuminated, in the present case, the ground 4, it will be stated that the range gate or cell is illuminated. While the following considerations apply to the entire ground area between the points 16 and 17 within the field of view 3, attention is directed to the range cells 12 and 13 for purposes of description.

When the range gate 5 is illuminated, the range cell 12 is illuminated. Consequently, a positive level video output is provided for the lower half of a television monitor. The range cell 13 is also illuminated, and a positive level video output is provided for the upper half of a television monitor. However, if the active television system 2 is ranged to respond to returns from a range gate 6, at a distance d6 (which is greater than d5), the range cell 13 is illuminated, but the range 12 is not. Consequently, a black level video output is provided for the lower half of a television monitor, and a positive level video output is provided for the upper half of a television monitor.

In accordance with the present invention in a manner described below, video signals indicative of returns from portions of the field of view between the points 16 and 17, for example, between the points 17 and 18 and points 18 and 16, are compared to automatically range the active television system 2 to respond to returns within the field of view 3. Automatic range gating results in maximum continuous useful information being received, rather than having lapses during which no useful optical information is received, as for example, when the active television system 2 ranged on the range cell 10.

Figure 2:
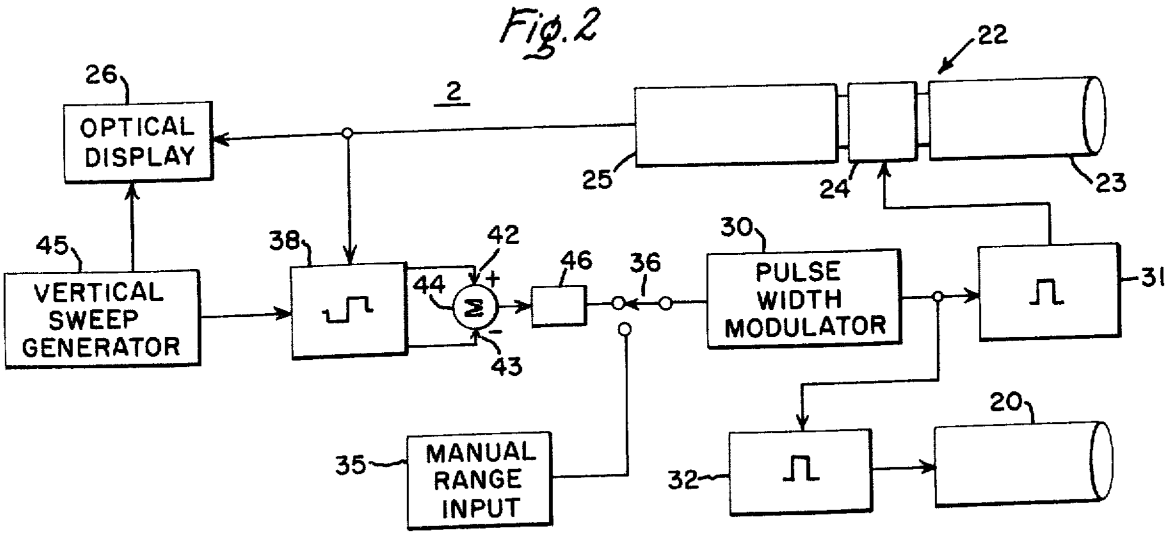
FIG. 2 is a block diagrammatic representation of a preferred embodiment of the present invention.

FIG. 2 is illustrative in block diagrammatic form of a system 4 accomplishing the present invention. A transmitter 20 is provided comprising a pulsed laser in the preferred embodiment. Returns are received by a receiver comprising a television camera 22 having a lens 23 which provides optical energy to a gated image intensifier 24. A vidicon tube 25 is coupled to the image intensifier 24 and provides electrical impulses indicative of scene brightness to utilization means. The utilization means in typical embodiments is an optical display 26. The optical display 26 preferably includes a television monitor.

Figure 3:
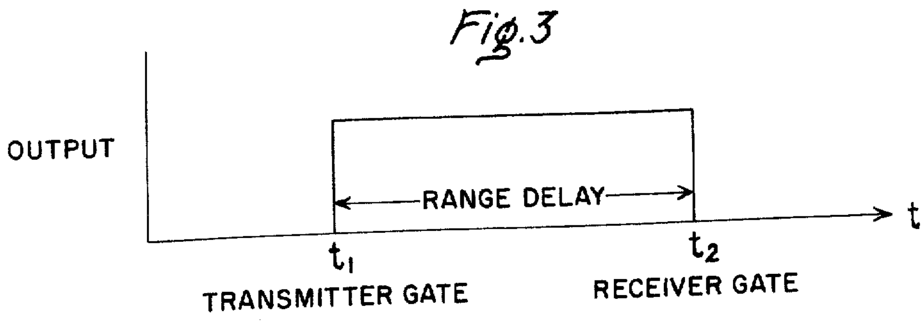
FIG. 3 is a wave form chart illustrative of the range delay signal produced for automatic ranging in the circuit of FIG. 2.

The range delay is determined by a pulse width modulator 30 providing a range delay signal illustrated in FIG. 3 coupled to a gating means comprising first and second one shot multivibrators 31 and 32. The one shot multivibrators 31 and 32 are respectively connected to the gated image intensifier 24 and the pulsed laser 20. As illustrated in FIG. 3, which represents a range delay signal, at time t1, a positive transition in the output of the pulse width modulator 30 switches the one shot multivibrator 32 to initiate a gate pulse to pulse the laser 20. At time t2, a time after t1 equal to the width of the range delay signal, a negative going transition of the range delay signal from the pulse width modulator 30 switches the one shot multivibrator 31 which initiates a gate pulse coupled to the gated image intensifier 24. The gating means are thus synchronized by the pulse width modulator 30. Transmission and reception depths of field are respectively determined by selection of the pulse widths produced by the one shot multivibrators 31 and 32. Other well-known timing circuitry may be used. The range delay, i.e., the pulse width in FIG. 3 from time t1 to t2 may be selected in a conventional prior art manner by connecting a manual range input unit 35 via a switch 36 closed in a first position to the pulse width modulator 30. The manual range input unit 35 may comprise any well-known means for determining the width of a pulse produced by a pulse width modulator, for example, as by supplying a control voltage. In accordance with the present invention, the switch 36 may be closed in a second position. The video output from the vidicon tube 25 is coupled to a switching unit 38 providing outputs to first and second inputs 42 and 43 of summing circuit 44. The switching unit 38 is coupled to and synchronized by timing circuitry comprising a vertical sweep generator 45 which, in the preferred embodiment, is the same sweep generator coupled to synchronize the television camera 22. The summing circuit 44 provides an output to an integrator 46, and the integrator 46 has an output coupled by the switch 36 to the pulse width modulator 30. The summing circuit 44 and integrator 46 comprise differential integrating means.

The switching unit 38 couples the video output of the vidicon tube 25 to the input 42 of the summing circuit 44 during one portion of the vertical sweep and couples the output of the vidicon tube 25 to the input 43 of the summing circuit 44 during a second portion of the vertical sweep. The output of the vidicon tube 25 is respectively coupled to the inputs 42 and 43 during provision of video to different responsive portions of the optical display 26. These responsive portions in the preferred embodiment are the upper and lower halves of the raster scanned by the vertical sweep generator 45. As explained above, when the system is properly ranged, a video output is provided by the vidicon tube 25 and when the system is not properly arranged, a black level video output is provided. Thus, if the system is ranged such that only the upper half of the field of view is ranged at the target, the integrator 46 provides an output of a first polarity, in the present embodiment a positive output. Similarly, a negative output in the present embodiment is indicative of ranging primarily between the points 17 and 18 of FIG. 1. The negative voltage generated by the output of the integrator 46 increases the range delay provided by the pulse width modulator 30 such that the system is ranged within the field of view of the receiver 22. Thus, the range delay signal (FIG. 3) may also be regarded as an error signal for closed loop control of ranging.

What is thus provided is closed loop automatic adjustment of range delay to keep the illuminated portion of the field of view which intersects the target centered on the target. Other modifications may be made by those skilled in the art in accordance with the above teaching to provide other embodiments of the present invention.

What is claimed as new and desired to be secured by Letters Patent of the United States is:

1. An automatically ranged active television system comprising, in combination:

a. a pulsed transmitter;

b. a gated television camera providing a video output;

c. an optical display means coupled to the output of said gated television camera and having a raster scan having upper and lower halves;

d. timing circuitry coupled to synchronize the raster scan of said optical display;

e. a switching circuit having an input coupled to the output of said gated television camera, and having first and second outputs, said switching circuitry being coupled to and synchronized by said timing circuitry such that a signal indicative of the video output of said gated television camera during the upper half of the raster scan is provided at said first output and a signal indicative of the video output of said gated television camera during the lower half of the raster scan is provided at said second output;

f. differential integrating means connected to said first and second outputs of said switching circuit and having an output comprising an error signal indicative of the difference in the video signals provided respectively during the upper and lower halves of the raster scan;

g. a pulse width modulator coupled to the output of said differential integrating means providing an output comprising a range delay signal having a pulse width determined by the error signal;

h. gating means having an input coupled to the output of said pulse width modulator and providing a first gate pulse to said pulse transmitter and a second gate pulse to said gated television camera, said gating means being synchronized by said pulse width modulator such that the second gate pulse is initiated at a time after the initiation of the first gate pulse equal to the width of the range delay signal, whereby the closed loop control of ranging of said active television system is provided.

2. In an active radiation detection and display system employing pulsed illumination means and range gated receiving means, range gate control means comprising, in combination:

imaging means for receiving radiation returns from a plurality of illumination pulses and integrating said returns to form a composite electronic image;

scanning means for sampling said image according to a predetermined raster pattern and for generating a serial readout of data embodied in said image;

means responsive to said data readout for comparing the data detected during a first portion of said raster scan with the data detected during a second portion of said raster scan; and adjustment means responsive to said last mentioned means for adjusting the range gate applied to said receiving means to equalize the data content in said two raster portions whereby the amount of data contained in said image is maximized.

3. The radiation detection and display system set forth in claim 2 wherein said pulsed illumination means comprises a source of electromagnetic radiation in the optical frequency range and said imaging means comprises a vidicon tube.

4. The radiation detection and display system set forth in claim 2 wherein said adjustment means includes variable time delay means for adjusting the interval between the illumination pulses and the leading edge of the range gate interval.

5. The radiation detection and display system set forth in claim 2 further comprising viewing means responsive to said data readout for reproducing a visible manifestation of said image.

6. The radiation detection and display system set forth in claim 2 wherein said comparing means operates to compare the amount of data contained in said image on either side of the center of said raster pattern whereby said image remains centered with respect to said pattern.

* * * * *